United States Patent Office 2,749,654
Patented June 12, 1956

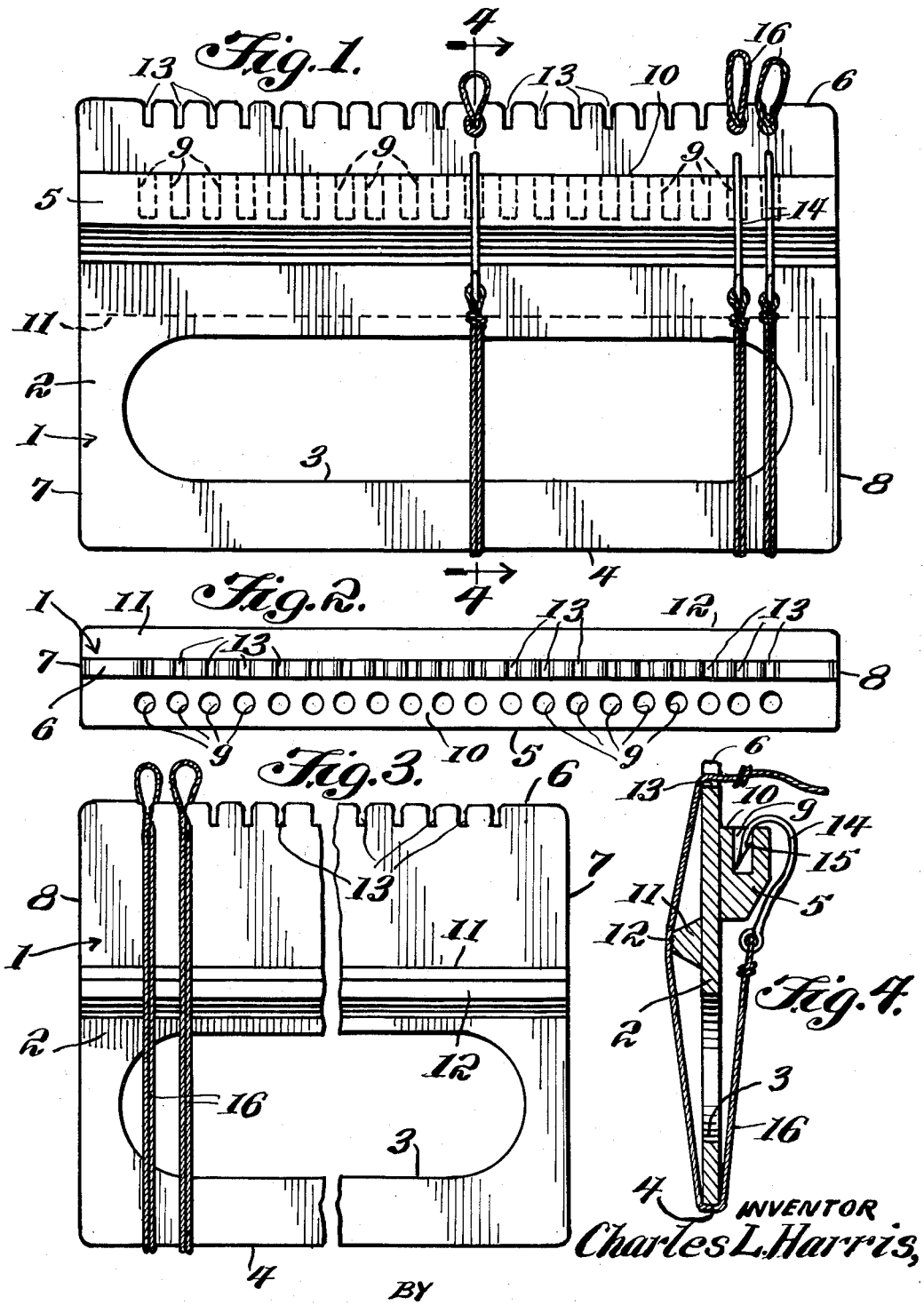

2,749,654

STAGING RACK

Charles L. Harris, Jefferson, Tex.

Application March 5, 1954, Serial No. 414,344

1 Claim. (Cl. 43—57.5)

This invention relates to a rack especially designed to hold fishhooks and their respective staging lines used in trot line and throw line fishing.

One of the primary objects of this invention is to provide a rack for lines of the type described which will prevent the entanglement thereof while drying.

Another further object of this invention is to provide a fish line rack of the type to which reference has been made which will permit selection of any desired line without disturbing any of the others secured to the rack and which will permit this selection to be made in darkness and even if the lines are wet.

A further object of this invention is to provide a fish line drying rack which will accommodate lines of varying lengths.

A still further object of this invention is to provide a fish line drying rack with means for sheathing the hook end thereof.

Another object of this invention is to provide a rack of the type described which is inexpensive to manufacture, non-complex in construction and application, and durable in use.

Other and further objects and advantages of this invention will become more apparent from a consideration of the following specification when read in the light of the annexed drawing, in which:

Figure 1 is a front elevation of a rack constructed in accordance with the teachings of this invention;

Figure 2 is a top plan view of the rack shown in Figure 1;

Figure 3 is a rear elevation of the rack; and

Figure 4 is a cross sectional view taken on the vertical planee of line 4—4 of Figure 1, looking in the direction of the arrows.

Referring now more specifically to the drawing, reference numeral 1 designates, in general, a rack constructed in accordance with the instant invention and which may be made of wood, metal, plastic or other materials. The rack 1 comprises a substantially rectangular main body portion 2 having an enlarged slot 3 formed therein adjacent the lower edge 4 thereof as viewed in Figures 1 and 3. The slot 3 extends longitudinally of the body and substantially parallel to the edge 4.

A bracket 5 is secured to and projects laterally from the front side of the rack 1 adjacent and parallel to the upper edge 6 thereof and extends longitudinally across the main body portion from one side 7 to the other side 8 thereof. The bracket 5 is provided with a plurality of longitudinally spaced hook receiving substantially cylindrical recesses 9 which extend downwardly from the upper end 10 thereof.

An elongated riser member 11 has one of its sides secured to the rear side of the main body portion 2 and is provided on its opposite side with a substantially narrow flat surface 12 substantially parallel to and spaced from the adjacent side of the main body portion 2. As seen in the drawing, the riser 11 iss positioned adjacent the upper edge of the slot 3 and extends longitudinally from edge 7 to edge 8.

A plurality of longitudinally spaced transversely extending slots 13 extend downwardly from the upper edge 6 of the main body portion 2, each slot being aligned with a recess 9 as shown in Fig. 1.

To use the above described rack 1, a fish hook 14 has the barbed end 15 thereof inserted within one of the recesses 9.

The other end of the hook 14 is secured to one end of a staging line 16 which line also passes across the front side of the body, across the slot 3 and around the lower edge 4 of the main body portion 2. The line 16 then extends upwardly across the body, across slot 3 again and over the flattened surface 12 and has the terminal end thereof inserted and wedged within one of the slots 13.

As seen in the drawing, the line 16 engages the main body portion 2 at only its top and bottom edges and the surface 12 of the riser 11 whereby air may strike against the line 14 and circulate through the slot 3 to dry the line 14 on each side thereof.

Having described and illustrated one embodiment of this invention in detail, it will be understood that the same is offered by way of example, and that the invention is to be limited only by the scope of the following claim.

What is claimed is:

A staging rack for fish hook staging lines comprising a relatively flat main body, said body having a plurality of spaced slots opening through one edge thereof, a bracket member having a plurality of spaced hook-receiving recesses therein extending longitudinally thereof and carried on one side of said body adjacent and parallel to the edge through which said slots open with each of said slots in alignment with one of said recesses, and a line riser carried on the other side of said body to project laterally therefrom and extend thereacross in parallel relation to said member and disposed to the side of said member remote from said bracket member, said element having a flat line-engaging surface extending longitudinally thereof and in parallel relation to the other side of the body.

References Cited in the file of this patent

UNITED STATES PATENTS

| | | |
|---|---|---|
| 333,384 | Bray | Dec. 29, 1885 |
| 485,582 | Howe | Nov. 1, 1892 |
| 578,458 | Knierieman | Mar. 9, 1897 |
| 595,998 | Garland | Dec. 21, 1897 |
| 1,737,376 | Knettles | Nov. 26, 1929 |
| 1,999,779 | Perrine | Apr. 30, 1935 |
| 2,604,720 | Woodward | July 29, 1952 |

FOREIGN PATENTS

| | | |
|---|---|---|
| 63,949 | Norway | Sept. 22, 1941 |